US007953677B2

(12) United States Patent
Baum-Waidner et al.

(10) Patent No.: US 7,953,677 B2
(45) Date of Patent: May 31, 2011

(54) COMPUTER-IMPLEMENTED METHOD, COMPUTER PROGRAM AND SYSTEM FOR ANALYZING DATA RECORDS BY GENERALIZATIONS ON REDUNDANT ATTRIBUTES

(75) Inventors: Birgit Baum-Waidner, Greenwich, CT (US); Klaus Julisch, Bonstetten (CH); Andreas Wespi, Niederhasli (CH)

(73) Assignee: International Business Machines Corporation, Armonk, NY (US)

( * ) Notice: Subject to any disclaimer, the term of this patent is extended or adjusted under 35 U.S.C. 154(b) by 801 days.

(21) Appl. No.: 11/959,669

(22) Filed: Dec. 19, 2007

(65) Prior Publication Data
US 2008/0222059 A1 Sep. 11, 2008

(30) Foreign Application Priority Data
Dec. 22, 2006 (EP) .................................. 06127174

(51) Int. Cl.
*G06F 15/18* (2006.01)
(52) U.S. Cl. ......................................................... 706/12
(58) Field of Classification Search .................... 706/12
See application file for complete search history.

(56) References Cited

U.S. PATENT DOCUMENTS

| | | | |
|---|---|---|---|
| 6,324,541 B1 | 11/2001 | de l'Etraz | |
| 6,789,252 B1* | 9/2004 | Burke et al. | 717/100 |
| 7,437,762 B2* | 10/2008 | Dacier et al. | 726/25 |
| 2001/0049632 A1 | 12/2001 | Rigole | |
| 2003/0110398 A1* | 6/2003 | Dacier et al. | 713/201 |
| 2004/0044519 A1* | 3/2004 | Polanyi et al. | 704/9 |
| 2004/0254768 A1 | 12/2004 | Kim et al. | |
| 2005/0028046 A1 | 2/2005 | McArdle | |
| 2006/0112328 A1* | 5/2006 | Rojer | 715/513 |
| 2007/0271292 A1* | 11/2007 | Acharya et al. | 707/102 |

FOREIGN PATENT DOCUMENTS
WO    WO 02103954    12/2002

OTHER PUBLICATIONS

Hilderman et al. "Parallel Knowledge Discovery Using Domain Generalization Graphs", LNCS, 1997, vol. 1263/1997, pp. 25-35.*
Cheung et al. "Efficient Rule-Based Attribute-Oriented Induction for Data Mining", Journal of Intelligent Information Systems, 2000, 15, pp. 175-200.*
Julisch et al. "Mining intrusion detection alarms for actionable knowledge", KDD, 2002, pp. 366-375.*
Hildeman, "Data Visualization in the DB-Discover System", Ninth IEEE International Conference On AI, Nov. 1997, pp. 474-477.

* cited by examiner

*Primary Examiner* — Donald Sparks
*Assistant Examiner* — Li-Wu Chang
(74) *Attorney, Agent, or Firm* — William Stock; Anne Vachon Dougherty

(57) ABSTRACT

A computer implemented method and system for analysing a first set of data records where each data record comprises attribute values for one or more attributes, by expanding the first set of data records into a second set of data records by creating for at least one of the attributes of the first set of data records at least two redundant attributes with corresponding redundant attribute values, assigning different generalization rules to the at least two redundant attributes, and performing a generalization of the second set of data records by means of an attribute-oriented induction (AOI)-algorithm.

14 Claims, 6 Drawing Sheets

| | T | SIP | DIP | Signature | Count |
|---|---|---|---|---|---|
| 301 — 1 | 00:01:54 | S1 | D1 | X | 1 |
| 302 — 2 | 00:03:05 | S1 | D1 | X | 1 |
| 303 — 3 | 00:02:50 | S1 | D1 | X | 1 |
| 304 — 4 | 00:03:05 | S2 | D2 | Y | 1 |
| 305 — 5 | 00:04:59 | S2 | D2 | Y | 1 |
| 306 — 6 | 00:05:02 | S2 | D2 | Y | 1 |
| 307 — Ncqmax | 2 | 3*4 | 3*4 | 3*4 | |

300

|     | T        | SIP | DIP | Signature | Count |
| --- | -------- | --- | --- | --------- | ----- |
| 1   | 00:01:54 | S1  | D1  | X         | 1     |
| 2   | 00:03:05 | S1  | D1  | X         | 1     |
| 3   | 00:02:50 | S1  | D1  | X         | 1     |
| 4   | 00:03:05 | S2  | D2  | Y         | 1     |
| 5   | 00:04:59 | S2  | D2  | Y         | 1     |
| 6   | 00:05:02 | S2  | D2  | Y         | 1     |
| Neqmax | 2     | 3*4 | 3*4 | 3*4       |       |

|        | T1       | T2       | T3       | T4       | SIP | DIP | Signature | Count |
| ------ | -------- | -------- | -------- | -------- | --- | --- | --------- | ----- |
| 1      | 00:01:54 | 00:01:54 | 00:01:54 | 00:01:54 | S1  | D1  | X         | 1     |
| 2      | 00:03:05 | 00:03:05 | 00:03:05 | 00:03:05 | S1  | D1  | X         | 1     |
| 3      | 00:02:50 | 00:02:50 | 00:02:50 | 00:02:50 | S1  | D1  | X         | 1     |
| 4      | 00:03:05 | 00:03:05 | 00:03:05 | 00:03:05 | S2  | D2  | Y         | 1     |
| 5      | 00:04:59 | 00:04:59 | 00:04:59 | 00:04:59 | S2  | D2  | Y         | 1     |
| 6      | 00:05:02 | 00:05:02 | 00:05:02 | 00:05:02 | S2  | D2  | Y         | 1     |
| Neqmax | 2        | 2        | 2        | 2        | 3*4 | 3*4 | 3*4       |       |

|        | T1          | T2          | T3          | T4          | SIP | DIP | Signature | Count |
| ------ | ----------- | ----------- | ----------- | ----------- | --- | --- | --------- | ----- |
| 1      | 00:00-00:08 | 23:54-00:02 | 23:56-00:04 | 23:58-00:06 | S1  | D1  | X         | 1     |
| 2      | 00:00-00:08 | 00:02-00:10 | 23:56-00:04 | 23:58-00:06 | S1  | D1  | X         | 1     |
| 3      | 00:00-00:08 | 00:02-00:10 | 23:56-00:04 | 23:58-00:06 | S1  | D1  | X         | 1     |
| 4      | 00:00-00:08 | 00:02-00:10 | 23:56-00:04 | 23:58-00:06 | S2  | D2  | Y         | 1     |
| 5      | 00:00-00:08 | 00:02-00:10 | 00:04-00:12 | 23:58-00:06 | S2  | D2  | Y         | 1     |
| 6      | 00:00-00:08 | 00:02-00:10 | 00:04-00:12 | 23:58-00:06 | S2  | D2  | Y         | 1     |
| Neqmax | 6           | 5           | 4           | 6           | 3*4 | 3*4 | 3*4       | 1     |

|   | T1 | T2 | T3 | T4 | SIP | DIP | Signature | Count |
|---|---|---|---|---|---|---|---|---|
| 1 | 00:00-00:08 | 23:54-00:02 | 23:56-00:04 | 23:58-00:06 | S1 | D1 | X | 1 |
| 2,3 | 00:00-00:08 | 00:02-00:10 | 23:56-00:04 | 23:58-00:06 | S1 | D1 | X | 2 |
| 4 | 00:00-00:08 | 00:02-00:10 | 23:56-00:04 | 23:58-00:06 | S2 | D2 | Y | 1 |
| 5,6 | 00:00-00:08 | 00:02-00:10 | 00:04-00:12 | 23:58-00:06 | S2 | D2 | Y | 2 |
| Neqmax | 6 | 5 | 4 | 6 | 3*4 | 3*4 | 3*4 | |

|   | T1 | T2 | T3 | T4 | SIP | DIP | Signature | Count |
|---|---|---|---|---|---|---|---|---|
| 1 | 00:00-00:08 | 23:54-00:02 | 23:40-00:20 | 23:58-00:06 | S1 | D1 | X | 1 |
| 2,3 | 00:00-00:08 | 00:02-00:10 | 23:40-00:20 | 23:58-00:06 | S1 | D1 | X | 2 |
| 4 | 00:00-00:08 | 00:02-00:10 | 23:40-00:20 | 23:58-00:06 | S2 | D2 | Y | 1 |
| 5,6 | 00:00-00:08 | 00:02-00:10 | 23:40-00:20 | 23:58-00:06 | S2 | D2 | Y | 2 |
| Neqmax | 6 | 5 | 6 | 6 | 3*4 | 3*4 | 3*4 | |

|   | T1 | T2 | T3 | T4 | SIP | DIP | Signature | Count |
|---|---|---|---|---|---|---|---|---|
| 1 | 00:00-00:08 | 23:54-00:02 | 23:40-00:20 | 23:58-00:06 | S1 | D1 | X | 1 |
| 2,3 | 00:00-00:08 | 00:02-00:10 | 23:40-00:20 | 23:58-00:06 | S1 | D1 | X | 2 |
| 4,5,6 | 00:00-00:08 | 00:02-00:10 | 23:40-00:20 | 23:58-00:06 | S2 | D2 | Y | 3 |
| Neqmax | 6 | 5 | 6 | 6 | 3*4 | 3*4 | 3*4 | |

| T merged | SIP | DIP | Signature | Count |
|---|---|---|---|---|
| 00:02-00:06 | S2 | D2 | Y | 3 |

|   | T1 | T2 | T3 | T4 | SIP | DIP | Signature | Count |   |
|---|----|----|----|----|-----|-----|-----------|-------|---|
| 1 | 00:01:54 | 00:01:54 | 00:01:54 | 00:01:54 | S1 | D1 | X | 1 | — 1101 |
| 2 | 00:03:05 | 00:03:05 | 00:03:05 | 00:03:05 | S1 | D1 | X | 1 | — 1102 |
| 3 | 00:02:50 | 00:02:50 | 00:02:50 | 00:02:50 | S1 | D1 | X | 1 | — 1103 |
| Neqmax | 1 | 1 | 1 | 1 | 3*4 | 3*4 | 3*4 |   | — 1104 |

|   | T1 | T2 | T3 | T4 | SIP | DIP | Signature | Count |   |
|---|----|----|----|----|-----|-----|-----------|-------|---|
| 1 | 00:00-00:08 | 23:54-00:02 | 23:56-00:04 | 23:58-00:06 | S1 | D1 | X | 1 | — 1201 |
| 2 | 00:00-00:08 | 00:02-00:10 | 23:56-00:04 | 23:58-00:06 | S1 | D1 | X | 1 | — 1202 |
| 3 | 00:00-00:08 | 00:02-00:10 | 23:56-00:04 | 23:58-00:06 | S1 | D1 | X | 1 | — 1203 |
| Neqmax | 3 | 2 | 3 | 3 | 3*4 | 3*4 | 3*4 |   | — 1204 |

Fig.13

|   | T1 | T2 | T3 | T4 | SIP | DIP | Signature | Count |   |
|---|----|----|----|----|-----|-----|-----------|-------|---|
| 1 | 00:00-00:08 | 23:54-00:02 | 23:56-00:04 | 23:58-00:06 | S1 | D1 | X | 1 | — 1301 |
| 2,3 | 00:00-00:08 | 00:02-00:10 | 23:56-00:04 | 23:58-00:06 | S1 | D1 | X | 2 | — 1302 |
| Neqmax | 3 | 2 | 3 | 3 | 3*4 | 3*4 | 3*4 |   | — 1303 |

Fig.14

|   | T1 | T2 | T3 | T4 | SIP | DIP | Signature | Count |   |
|---|----|----|----|----|-----|-----|-----------|-------|---|
| 1 | 00:00-00:08 | 23:30-00:10 | 23:56-00:04 | 23:58-00:06 | S1 | D1 | X | 1 | — 1401 |
| 2,3 | 00:00-00:08 | 23:30-00:10 | 23:56-00:04 | 23:58-00:06 | S1 | D1 | X | 2 | — 1402 |
| Neqmax | 3 | 3 | 3 | 3 | 3*4 | 3*4 | 3*4 |   | — 1403 |

Fig.15

|   | T1 | T2 | T3 | T4 | SIP | DIP | Signature | Count |   |
|---|----|----|----|----|-----|-----|-----------|-------|---|
| 1,2,3 | 00:00-00:08 | 23:30-00:10 | 23:56-00:04 | 23:58-00:06 | S1 | D1 | X | 3 | — 1501 |
| Neqmax | 3 | 3 | 3 | 3 | 3*4 | 3*4 | 3*4 |   | — 1502 |

Fig.16

| T merged | SIP | DIP | Signature | Count |   |
|----------|-----|-----|-----------|-------|---|
| 00:00-00:04 | S1 | D1 | X | 3 | — 1601 |

COMPUTER-IMPLEMENTED METHOD, COMPUTER PROGRAM AND SYSTEM FOR ANALYZING DATA RECORDS BY GENERALIZATIONS ON REDUNDANT ATTRIBUTES

FIELD OF THE INVENTION

The present invention generally relates to a computer implemented method, a computer program and a system for analysing data records.

BACKGROUND OF THE INVENTION

In information technology, many processes, applications and environments face growing demand for analyzing data records. Such environments and applications can be e.g. computer networks, network management systems, intrusion detection systems, credit card transaction systems, flight booking management systems or warranty claim processing systems.

Data analysis according to the present invention comprises in particular data mining. Data mining can be used to detect anomalies or data aggregations in the data records. Detecting anomalies or aggregations in data records may be used for protection purposes (e.g. in intrusion detection systems), for detecting fraud (e.g., in financial transactions), for control purposes or for general observations (e.g. to improve manufacturing processes by analyzing warranty claims)

For analyzing a given situation in such technical systems or applications, data records extracted from events are used. Examples for events are pieces of traffic in a network, alarms of intrusion detection systems or information about credit card transactions, phone calls, flight bookings or warranty claims.

The quality of protection, control and observation relies on the quality of information extracted from the volume of data records. The volume of data records of such applications is usually so high that it cannot be handled efficiently by human beings. In "Jiawei Han and Micheline Kamber, Data Mining, Concepts and Techniques, Academic Press, 2001" an overview of known data mining methods is provided.

An overview of known intrusion detection systems is given in "Kathleen A. Jackson, INTRUSION DETECTION SYSTEM (IDS) PRODUCT SURVEY, Version 2.1, Los Alamos National Laboratory 1999, Publication No. LA-UR-99-3883, Chapter 1.2, IDS OVERVIEW".

Intrusion detection systems analyse activities of internal and/or external users for forbidden and/or anomalous behaviour. They are based on the assumption that misuse can be detected by monitoring and analysing network traffic, system audit records, system configuration files or other data sources.

False alarms, appearing in large numbers, are a severe problem because investigating them requires time and energy. If the load of false alarms in a system gets high, human system administrators or security personnel might be too overwhelmed to be able to identify the true alarms.

In "Klaus Julisch, Marc Dacier: "Mining Intrusion Detection Alarms for Actionable Knowledge, KDD 2002" a method for analyzing intrusion detection alarms is described. The method is based on Attribute-Oriented Induction (AOI) algorithms. AOI algorithms are a set-oriented database mining method which generalizes data records attribute-by-attribute, compresses it into a generalized relation, and extracts from it the general features of data. In other words, attribute-oriented induction summarizes the information in a database by repeatedly replacing specific attribute values with more general concepts according to user-defined concept hierarchies or generalization rules.

Due to the ever increasing amount of electronic data records, there is a need for analysis methods with improved efficiency, accuracy and/or speed.

In light of the foregoing, it would be desirable to provide an improved computer implemented method, a computer program and a computer system for analyzing data records in which various problems associated with known systems discussed above can be alleviated.

SUMMARY AND ADVANTAGES OF THE INVENTION

The present invention is directed to a computer implemented method, a computer system and a computer program as defined in independent claims. Further embodiments of the invention are provided in the appended dependent claims.

According to a first aspect of the present invention there is provided a computer implemented method for analysing a first set of data records, wherein each data record comprises attribute values for one or more attributes, the method comprising the steps of:

expanding the first set of data records into a second set of data records by creating for at least one of the attributes of the first set of data records at least two redundant attributes with corresponding redundant attribute values, assigning different generalization rules to the at least two redundant attributes, performing a generalization of the second set of data records by means of an attribute-oriented induction (AOI)-algorithm.

This method has the advantage that it improves the generalization of attribute oriented induction algorithms. In particular, it delivers more precise and accurate generalization results. This is achieved by assigning different generalization rules to the redundant attributes and treating the redundant attributes completely independent and separate.

In an expanding step the starting basis of the AOI-algorithm is broadened. This is established by means of creating for at least one of the attributes of the first data set of data records at least two redundant attributes. In other words, at least one of the attributes of the first data set is replaced by at least two redundant attributes. The two redundant attributes comprise preferably identical attribute values.

In an assigning step, different generalization rules are assigned to the at least two redundant attributes. A generalization rule is a rule which defines according to which rule the corresponding attribute will be generalized.

In a generalization step the second set of data records is generalized by means of an attribute oriented induction (AOI) algorithm. An AOI algorithm is an algorithm according to which a set of data records is generalized attribute by attribute. According to this aspect of the present invention the AOI algorithm uses as a starting basis the expanded second set of data records with the redundant attributes. The redundant attributes are treated as normal attributes, i.e. in the same way as any other attributes. In other words, also during the different steps of the AOI algorithm, the redundant attributes are treated as separate and independent attributes. As an example, the AOI algorithm may generalize in one step only a first redundant attribute, while a second redundant attribute remains unchanged. In a further generalization step, the second redundant attribute may be generalized, while the first redundant attribute remains unchanged. In addition, there may be generalization steps of the AOI algorithm where both the first and the second redundant attribute are generalized in parallel in one generalization step of the AOI algorithm.

The computer implemented method has various improved technical effects. According to one aspect it delivers improved results. Such improved results improve the technical function of the technical system which has provided the data records. As an example, the data records may be alarm logs of an intrusion detection system. Due to the efficient, quick and improved analysis of these alarm logs the security of the corresponding network that is observed by the intrusion detection system is improved. The improvement is in particular based on the quality of the resulting clusters.

According to a preferred embodiment of this aspect of the invention the generalization is performed by means of sequentially repeating the following steps in a loop until a predefined generalization criterion is satisfied:

selecting one or more of the attributes of the second set of data records for generalization according to a predefined selection strategy, generalizing the attribute values of the selected attributes according to the corresponding generalization rule, group data records that are covered by the generalization into a data record cluster.

The selection strategy defines which one or which ones of the attributes of the second set of data records is or are selected for the next generalization step. Then the attribute values of the selected attribute or the selected attributes respectively are generalized according to the generalization rule. Then it is evaluated whether two or more data records are covered by the generalization. In other words, it is checked if after the respective generalization step there are two or more identical data records. If this is the case, the two or more identical data records establish a data record cluster and accordingly they are grouped in such a data record cluster. According to an embodiment of this aspect of the invention, the predefined generalization criterion is a minimum cluster size of the data record cluster. In other words, the predefined generalization criterion defines a minimum number of data records that shall be covered by the generalization. As an example, if the minimum cluster size has been set to n=4, this would mean that the generalization steps have to be performed until n=4 identical generalized data records have been found. These four identical generalized data records establish a data record cluster with the minimum cluster size 4.

According to a further embodiment of this aspect of the invention the predefined selection strategy is a heuristic strategy. Heuristic strategies are an efficient compromise to perform the generalization in a reasonable amount of time.

According to a further embodiment of the invention upon satisfaction of the predefined selection criterion the generalisation is performed from scratch with the remaining data records.

In other words, the data record cluster that satisfies the predefined generalization criterion is removed from the second set of data records. This includes the removal of all the data records that are grouped into this data record cluster. Then the generalization is performed from scratch with the remaining data records, i.e. the data records that do not belong to the found and removed data record cluster. Performing the generalization from scratch means that all the generalization steps that have been performed so far for the remaining data records are undone. In other words, the generalization starts again with the original attribute values of the remaining data record clusters. This embodiment of the invention avoids over-generalization.

According to a further embodiment of this aspect of the invention the generalization rules for the redundant attributes define generalized attribute values for the corresponding redundant attribute values, wherein the generalized attribute values are value sets or value ranges.

According to a further embodiment of this aspect of the invention at least two of the value sets or value ranges of different redundant attributes overlap with each other.

Such overlapping generalized attribute values improve the flexibility of the AOI-algorithm and provide better and more precise generalization results. They are in particular useful for identifying and mining anomalies in the data records. In particular, it has the effect that the boundaries of the data record clusters that can be found by the AOI algorithm are more flexible. This results in data record clusters that are more natural. A generalized attribute value may be defined as an attribute value that comprises two or more attribute values of the previous generalization step.

According to a further embodiment of the invention the generalized attribute values are generalized intervals.

Preferably the boundaries of the generalized intervals are chosen in such a way that the generalized attribute values of the redundant attributes overlap with each other.

According to a further embodiment of this aspect of the invention the predefined selection strategy is defined as follows:

determine the maximum number of identical attribute values for each of the attributes of the second set of data records, select the attributes with the smallest maximum number of identical attribute values for the next generalization step.

Such a selection strategy is very efficient. The maximum number of identical attribute values is counted before each generalization step. In other words, the attribute values that are identical are counted for each attribute value and then the maximum number of these counts is determined for each of the attributes of the second set of data records. If an attribute value belongs to or represents a data record cluster, the respective number of original data records that belong to this cluster should be used for the determination of the maximum number. In other words, an attribute value that covers n-original data records, should be counted n-times for the determination of the maximum number of identical attribute values. Then the smallest number of these maximum numbers is determined and the corresponding attribute or the corresponding attributes are selected and generalized. If there are two or more smallest maximum numbers, the corresponding two or more attribute values may be selected and generalized in parallel in one generalization step or only one or a subgroup is chosen to be generalized, e.g. randomly or according to various other predefined criteria. According to a further preferred embodiment of the invention the maximum numbers of identical attribute values are weighed with a weighing factor and then the attribute value with the lowest weighed maximum number of identical attribute values is chosen for generalization in the next generalization step.

Such a selection strategy is described in more detail in US20030110398A1 that is herewith incorporated by reference.

According to a further embodiment of this aspect of the invention the generalization rules of the attributes establish a generalization hierarchy.

According to a further embodiment of this aspect of the invention the method comprises further the step of merging the generalized attribute values of the redundant attributes of a data record cluster into a merged data record cluster by means of intersection.

Such a merging step removes the added redundancy from the data record clusters. As a result, the merged data record clusters can represent data anomalies more accurate. The advantage of this embodiment of the invention is that before the generalization redundancy is added by means of the expanding step and after the generalization the redundancy is removed again by means of the merging step.

This results in more natural and more precise data record clusters.

The merged data record cluster is established by creating the intersection of the generalized attributes of the redundant attribute values. In other words, the two or more redundant generalized attributes are merged into a single generalized attribute. This single generalized attribute comprises the intersection of the two or more redundant attributes. For example, if the generalized attributes are intervals, the merged interval comprises as lower boundary the highest boundary of the lower boundaries of the redundant generalized attributes and as upper boundary the lowest boundary of the upper boundaries of the redundant generalized attributes.

According to a further embodiment of this aspect of the invention the method comprises further the step of forwarding the data record clusters for further processing if the number of data records covered satisfy a predefined forwarding criterion.

Such predefined forwarding criterion may be a predefined minimum number of data record clusters covered by the generalization. The data record clusters may then be used for control or adaptation purposes of the technical system whose data records have been analyzed.

The data records may comprise e.g. information about events of traffic in a computer network, alarms of intrusion detection systems or measurement data of a manufacturing process.

According to a second aspect of the present invention there is provided a computer program comprising instructions for carrying out the steps of the method according to any one of the method claims when said computer program is executed on a computer system.

According to a third aspect of the present invention there is provided a computer system comprising means for carrying out the steps of the method according to any one of the method claims.

The steps of the different aspects of the invention can be performed in different orders. Furthermore, the steps may also be combined, i.e. that e.g. two or more steps are performed together.

Any of the computer system or computer program features may be applied to the method aspect of the invention and vice versa. Advantages of the computer system or computer program features apply to corresponding method features and vice versa.

BRIEF DESCRIPTION OF THE DRAWINGS

Some of the objects and advantages of the present invention have been stated, others will appear when the following description is considered together with the accompanying drawings, in which:

FIG. 3 shows a table with a first set of data records that serve as input for a data analysis method according to an embodiment of the invention;

FIG. 5 shows a table with a second set of data records that was derived by an expanding step from the first set of data records as shown in FIG. 3;

FIG. 6 shows a table with the second set of data records after a first generalization step;

FIG. 7 shows the table of FIG. 6 after grouping data records that are covered by the first generalization into a data record cluster;

FIG. 8 shows a table with the second set of data records after a second generalization step;

FIG. 9 shows the table of FIG. 8 after grouping the data records that are covered by the second generalization step into a data record cluster;

FIG. 10 shows the data record cluster of FIG. 9 after a merging step;

FIG. 11 shows a table with the remaining data records of the original second set of data records after having removed the found data record cluster;

FIG. 12 shows a table with the remaining second set of data records after a first generalization step;

FIG. 13 shows the table of FIG. 12 after grouping data records that are covered by the first generalization step into a data record cluster;

FIG. 14 shows a table with the remaining second set of data records after a second generalization step;

FIG. 15 shows the table of FIG. 14 after grouping the data records that are covered by the second generalization step into a data record cluster;

FIG. 16 shows the data record cluster of FIG. 15 after a merging step.

DETAILED DESCRIPTION OF THE PREFERRED EMBODIMENTS

Figure 1:
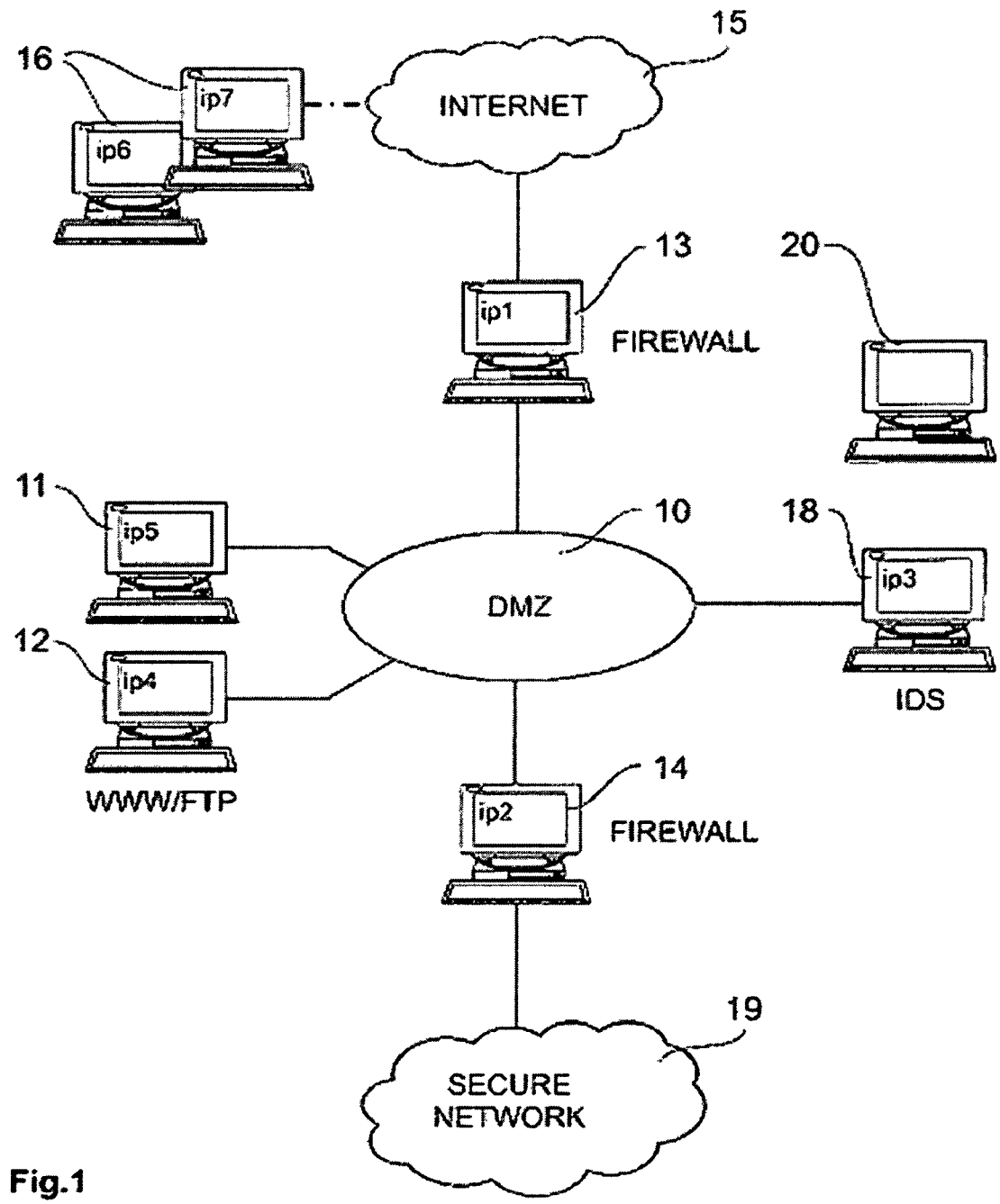
FIG. 1 shows a schematic view of a computer network topology comprising firewalls and a DMZ.

FIG. 1 shows a schematic view of a computer network topology comprising firewalls 13, 14 and a demilitarized zone 10, below referred to as DMZ. DMZ is a term often used when describing firewall configurations. The DMZ 10 is an isolated subnet between a secure network 19 and an external network such as the Internet 15. Clients 16 operating in the Internet 15 may access Web servers and other servers 11, 12 in the DMZ 10, which are provided for public access. The servers 11, 12 are protected to some degree by placing an outer firewall 13 (often a packet-filtering router) between the Internet 15 and the servers 11, 12 in the DMZ 10. The outer firewall 13 forwards only those requests into the DMZ 10 which are allowed to reach the servers 11, 12. Further the outer firewall 13 could also be configured to block denial-of-service attacks and to perform network address translation for the servers 11, 12 in the DMZ 10. The inner firewall 14 is designed to prevent unauthorized access to the secure network from the DMZ 10 and perhaps to prevent unauthorized access from the secure network to the DMZ 10 or the Internet 15. Network traffic in the DMZ 10 is sensed and analysed by an intrusion detection system 18 which, as described above, triggers alarms when detecting patterns of attacks or anomalous behaviour. The intrusion detection system 18 sends the alarms as data records to a computer analysis system 20 that is provided for analysing the received data records. In particular, the computer analysis system 20 is provided for data mining.

Figure 2:
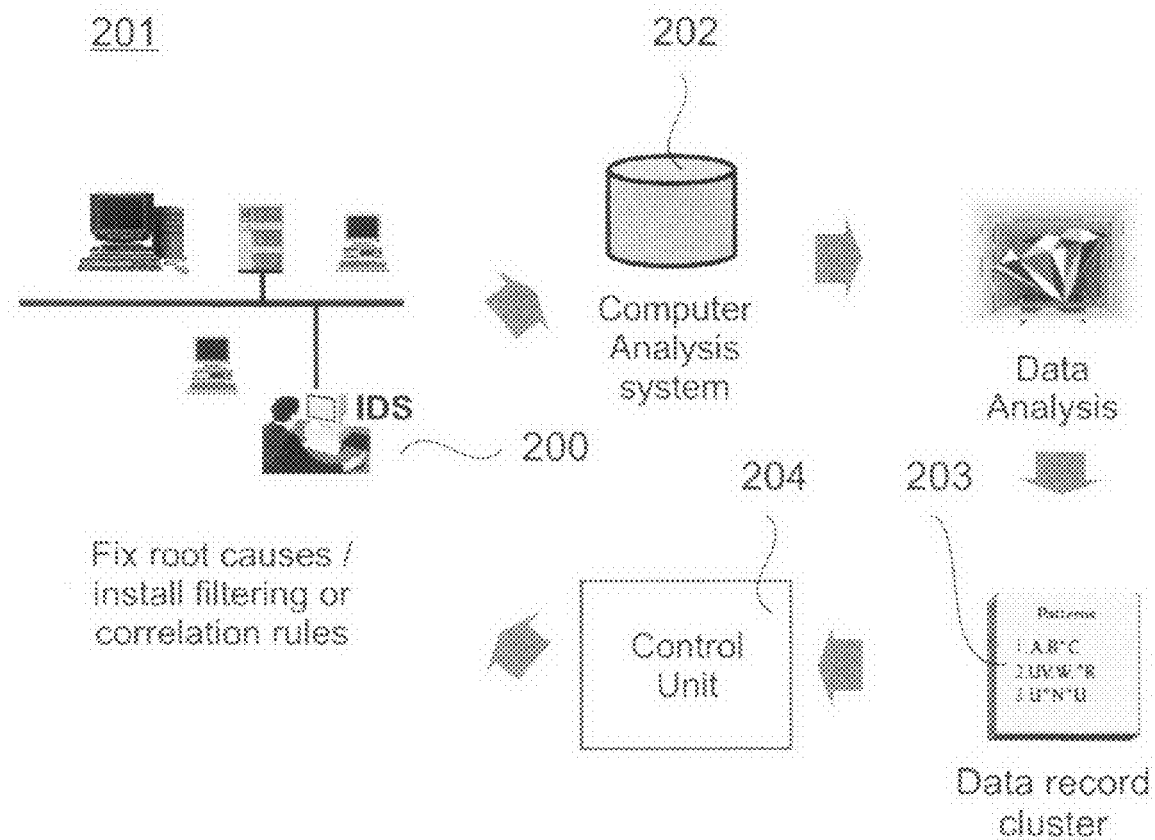
FIG. 2 illustrates schematically an application of a method according to an exemplary embodiment of the invention.

FIG. 2 illustrates schematically an application of a method for analysing data records according to an exemplary embodiment of the invention. In this embodiment an intrusion detection system 200 observes the network traffic of a computer network 201. The intrusion detection system 200 analyses the network traffic in the computer network 201 and triggers alarms when detecting patterns of attacks or anomalous behaviour. The intrusion detection system 200 sends the alarms as data records to a computer analysis system 202 that is provided for analysing the received data records. In particular, the computer analysis system 202 is provided for performing data mining on the received data records. The computer analysis system 202 may comprise one or more computers, storage devices and an analysis software. The computer analysis system 202 is provided for performing the methods according to the embodiments of the invention. As a result of the analysis of the received data records it forwards data record clusters 203 for further processing and/or analysis to a control unit 204. The control unit 204 may be established by means of a computer system. As an alternative, a system administrator may serve as a control unit 204. The control unit 204 might be outsourced. The control unit 204 interprets the received data record clusters 203, may perform some post-processing, and draws conclusions whether any actions are required or desired in order to protect or improve the security of the computer network 201. If considered appropriate, the control unit 204 initiates actions to protect or improve the security of the computer network 201. Such appropriate actions could be e.g. to fix root causes or to install filtering or correlation rules.

FIG. 3 shows a table with a first set 300 of 6 data records 301-306. Referring back to FIG. 2, this first set 300 of data records 301-306 was generated by the intrusion detection system 200 and forwarded to the computer analysis system 202. Each of the 6 data records 301-306 comprises attribute values for the attributes T, SIP, DIP and Signature. T represents the time of an intrusion event, SIP the source IP address of the intrusion event, DIP the destination IP address of the intrusion event and the signature the type of attack. The last row 307 comprises the highest number $N_{eqmax}$ of attribute values of the respective attribute that are identical. As an example, for the attribute T $N_{eqmax}$ is 2 as there are only two identical attribute values, namely 00:03:05. In addition, $N_{eqmax}$ is weighed with a weighing factor. The weighed value of $N_{eqmax}$, also referred to as $wN_{eqmax}$, is shown as multiplication factor in the last row 307. The weighing factor for T is 1 and the weighing factor for SIP, DIP and Signature is 4.

The weighing factor according to this exemplary embodiment is a constant value per attribute, but can generally be any function which might not only take into account the attribute, but also the generalized attribute values, the level of generalization, and/or any other circumstances.

Figure 4:
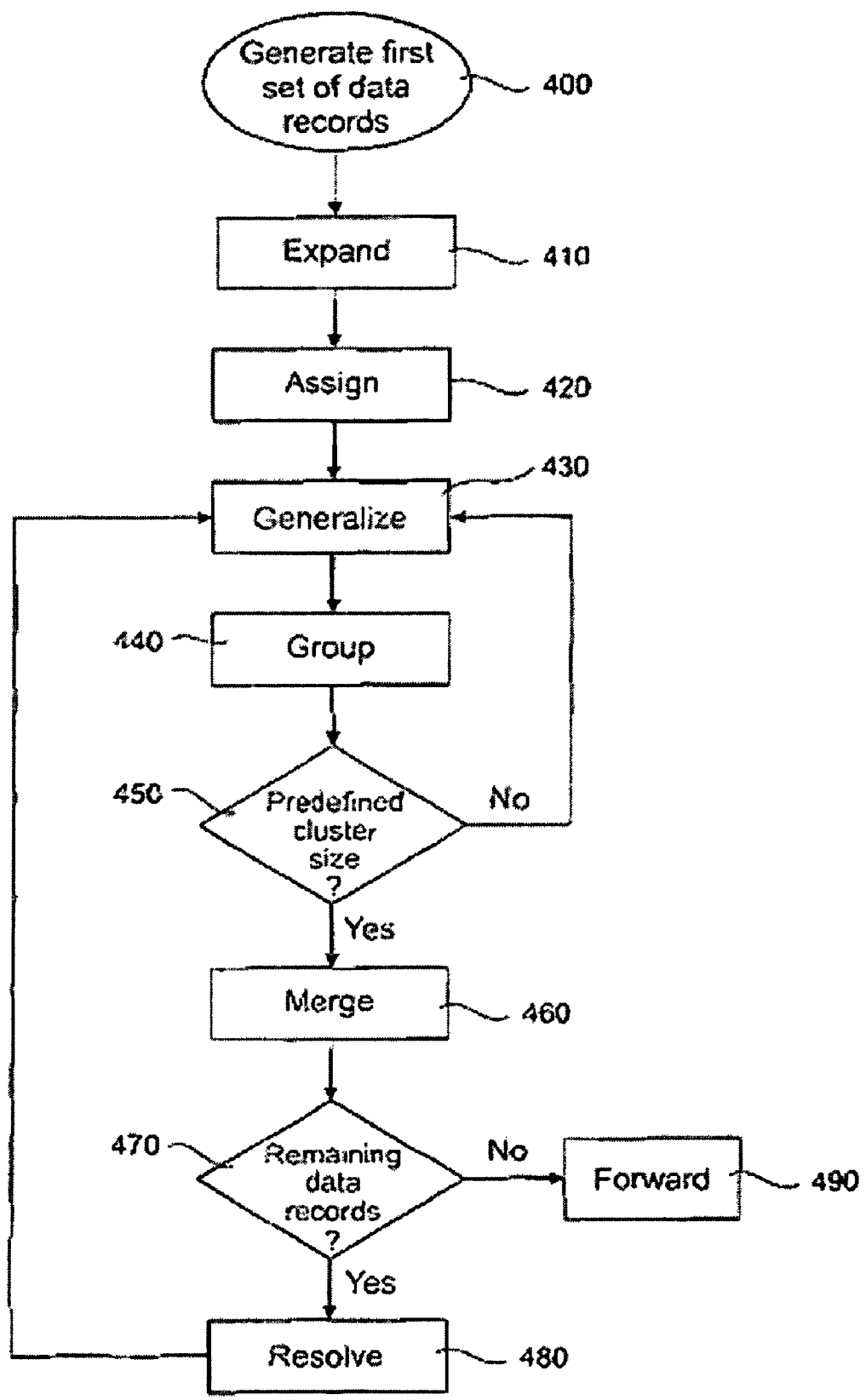
FIG. 4 shows a flow chart of a method for analysing first sets of data records according to an embodiment of the invention.

In the following a method for analysing this first set 300 of data records is described in more detail with reference to FIG. 4. FIG. 4 shows a flow chart of a method for analysing first sets of data records according to an embodiment of the invention.

In a step 400 the first set of data records is generated or received respectively. In an expanding step 410 the first set of data records 300 is expanded into a second set of data records 500. In other words, the first set of data records 300 is transformed into a second set of data records 500. This expanding step is performed by creating for the time attribute T of the first set of data records 300 as shown in FIG. 3 four redundant attributes T1, T2, T3 and T4 with identical attribute values.

FIG. 5 shows a table with the second set 500 of data records 501-506 after the expanding step 410. Referring back to FIG. 2, this second set 500 of data records 501-506 was generated by the computer analysis system 202. Each of the 6 data records 501-506 comprises four redundant attributes T1, T2, T3 and T4 as well as the attributes SIP, DIP and Signature.

The redundant attributes T1, T2, T3 and T4 comprise corresponding redundant attribute values for the six data records 501-506. In other words, the original attribute T with the corresponding attribute values has been replaced by the attributes T1, T2, T3 and T4, wherein the attribute values of T1, T2, T3 and T4 are identical to the attribute values of T.

Referring back to FIG. 4, in an assignment step 420 there is assigned a different generalization rule to each of the four redundant attributes T1, T2, T3 and T4. In this example the generalization rule is a generalization hierarchy. The time attributes T1-T4 have each weight 1.

According to this exemplary embodiment of the invention the generalization rules for the redundant attributes T1, T2, T3 and T4 define generalized intervals for the corresponding attribute values. Generalization of an attribute value implies that all previous values of the old (generalized or not) attribute value are contained in the new generalized attribute value.

The boundaries of the generalized intervals are chosen in such a way that the generalized intervals overlap with each other. As an example, there is at least one generalized interval of T1 which overlaps with at least one generalized interval of T2.

To the first redundant attribute T1 there is assigned a first generalization rule comprising a first, a second and a third generalization step. The first generalization step of the first generalization rule is established by means of a first interval raster of 8 minutes defined by a raster point 00:00:00. The second generalization step of the first generalization rule is established by means of a second raster of intervals of 40 minutes defined again by the raster point 00:00:00. The third generalization step of the first generalization rule is established by means of a third raster of intervals of 200 minutes defined by the raster point 00:00:00.

To the second redundant attribute T2 there is assigned a second generalization rule comprising a first, a second and a third generalization step. The first generalization step of the second generalization rule is established by means of a first raster of intervals of 8 minutes defined by a raster point 00:02:00. The second generalization step of the second generalization rule is established by means of a second raster of intervals of 40 minutes defined by a raster point 00:10:00 (which, e.g., implies that the interval 23:54:00-00:02:00 can be generalized to the interval 23:30-00:10:00). The third generalization step of the second generalization rule is established by means of a third raster of intervals of 200 minutes defined by a raster point 00:50:00.

To the third redundant attribute T3 there is assigned a third generalization rule comprising a first, a second and a third generalization step. The first generalization step of the third generalization rule is established by means of a first raster of intervals of 8 minutes defined by a raster point 00:04:00. The second generalization step of the third generalization rule is established by means of a second raster of interval of 40 minutes defined by a raster point 00:20:00. The third generalization step of the third generalization rule is established by means of a third raster of intervals of 200 minutes defined by a raster point 01:40:00.

To the fourth redundant attribute T4 there is assigned a fourth generalization rule comprising a first, a second and a third generalization step. The first generalization step of the fourth generalization rule is established by means of a first raster of intervals of 8 minutes defined by a raster point 00:06:00. The second generalization step of the fourth generalization rule is established by means of a second raster of interval of 40 minutes defined by a raster point 00:30:00. The third generalization step of the fourth generalization rule is established by means of a third raster of intervals of 200 minutes defined by a raster point 02:30:00.

In the following an overview of the generalization rules of the four redundant attributes is provided:

| 1st generalization step: | |
| --- | --- |
| T1: 8 min raster, | raster point 00:00:00 |
| T2: 8 min raster, | raster point 00:02:00 |
| T3: 8 min raster, | raster point 00:04:00 |
| T4: 8 min raster, | raster point 00:06:00 |

| 2nd generalization step: | |
| --- | --- |
| T1: 40 min raster, | raster point 00:00:00 |
| T2: 40 min raster, | raster point 00:10:00 |
| T3: 40 min raster, | raster point 00:20:00 |
| T4: 40 min raster, | raster point 00:30:00 |

| 3rd generalization step: | |
| --- | --- |
| T1: 200 min raster, | raster point 00:00:00 |
| T2: 200 min raster, | raster point 00:50:00 |
| T3: 200 min raster, | raster point 01:40:00 |
| T4: 200 min raster, | raster point 02:30:00 |

In this exemplary embodiment of the invention the generalized intervals perform an ideal overlapping. If there are n redundant attributes, the border of one attribute cuts some multiple of 1/n of each other of the n redundant attributes. Appropriate adaptations to those rasters can be made according to the concrete distribution of the expected values or other criteria, e.g., the semantics of intervals or sets of values, in order to achieve an ideal overlapping with respect to this distribution and/or those other criteria. Also all the rasters can be moved completely to avoid specific raster points (i.e., the time point 00:00:00 might be avoided completely to make sure that accumulations of values around that time point, some time before and some time after, will ever be cut into different data record clusters.

In each of the $2^{nd}$ and $3^{rd}$ generalization steps as described above, the new generalized attribute value (interval) is established by appending 4 previous intervals to one another, thereby including the previous intervals (which, again, contain the previous values). The $1^{st}$ generalization step is established by replacing the original value (e.g., a time point) by the corresponding interval (e.g., a time interval) containing that value.

In general, in order to provide an ideal overlapping in the next generalization step, a n-times redundancy requires n+1 as the smallest factor to summarize intervals to one generalized interval. In this example, the redundancy is 4 and hence the generalized intervals have to be enlarged by the factor 5 in each generalization step in order to have again an ideal overlapping. Accordingly, since the first generalization step comprises results in intervals of 8 minutes, the second generalization step will result in intervals of 5*8=40 minutes and the third generalization step will result in intervals of 5*40=200 minutes.

In the following, a method for performing a generalization of the second set of data records 500 by means of an attribute oriented induction algorithm is explained in more detail.

Attribute oriented induction (AOI) is a set-oriented database mining method which generalizes the task-relevant subset of data attribute-by-attribute, compresses it into a generalized relation, and extracts from it the general features of data. AOI clustering algorithms may work with generalizations defined for each single attribute and can handle heterogeneous data records with different types of attributes. In other words, an attribute oriented induction algorithm performs a generalization of a set of data records by performing an attribute by attribute generalization. Each of the attributes of the set of data records is assigned with a corresponding generalization hierarchy. There are different generalization strategies for deciding which of the attributes will be generalized next.

In this exemplary embodiment of the invention we use an AOI algorithm as described in US20030110398A1 that is herewith incorporated by reference.

It is apparent to a skilled person in the art that other attribute oriented induction algorithms may be used as well.

For each attribute, i.e. for each column of the table of FIG. 5 the number $N_{eq}$ of attribute values that are identical is determined. The largest number of them is called $N_{eqmax}$. In addition, $N_{eqmax}$ is weighed with the weighing factor. The weighed value of $N_{eqmax}$, also referred to as $wN_{eqmax}$, is shown as multiplication factor in the last row 507 of the second set of data records 500.

Then the attribute value with the lowest $wN_{eqmax}$, also referred to as min ($wN_{eqmax}$), is chosen for generalization in the next generalization step. In this example, the original attribute values of the attributes T1, T2, T3 and T4 comprises each only two identical attribute values, namely the attribute value 00.03:05. As the weight is 1, $wN_{eqmax}$ is 2 for the four redundant attribute values T1, T2, T3 and T4. The further attributes SIP, DIP and Signature comprises a maximum number of identical attributes $N_{eqmax}$ of 3, namely S1 and S2 for SIP, D1 and D2 for DIP and X and Y for Signature, each with weight 4. Hence $wN_{eqmax}$ is 12 for SIP, DIP and Signature.

According to the AOI algorithm of this exemplary embodiment of the invention, the attribute value with the lowest $wN_{eqmax}$ is chosen for generalization in the first generalization step. In this example, the lowest $wN_{eqmax}$, also referred to as min ($wN_{eqmax}$), is 2 for T1, T2, T3 and T4. Any of those four attributes can be chosen to be generalized next or they might be generalized in parallel. In this example the order is not important, on the one hand, the required minimum cluster size will not be achieved before all redundant attribute values T1, T2, T3, T4 have been generalized, and, on the other hand, after each of those generalizations, the min ($wN_{eqmax}$) will still be 2 as long as at least one of the redundant attribute values T1, T2, T3, T4 has not been generalized yet. Accordingly, the attributes T1, T2, T3 and T4 are generalized in parallel or in four succeeding generalization steps 430 according to their corresponding generalization rules. The result of the generalization steps 430 is shown in FIG. 6. The attribute values of the four redundant attributes T1, T2, T3 and T4 have been generalized according to their corresponding generalization rule of the first generalization step each. In other words, the point of times of the intrusion events have been replaced by the corresponding intervals defined by the first generalization step for each of the redundant attribute T1, T2, T3 and T4. As an example, the attribute value of T2 of the second data record is 00:01:54. It falls within the interval 23:54-00:02 of the first generalization rule of the second attribute T2. Hence the point in time 00:01:54 is replaced by the time interval 23:54-00:02.

In a grouping step 440 it is checked whether the generalization step 430 has resulted in any identical generalized data records. In this example, the generalized data records 602 and 603 as well as the generalized data records 605 and 606 are identical and can hence be grouped in data record clusters. This grouped second set of data records after the first generalization step is shown in FIG. 7. It comprises a data record cluster 702, covering the generalized data records 602 and 603 as well as a data record cluster 705 covering the generalized data records 605 and 606. As the data record cluster 702 and the data record cluster 705 cover two generalized data records, the value in the count column is set to 2.

In step 450 it is checked whether one of the data record clusters 702 or 705 fulfill a predefined generalization criterion. In this example, the predefined generalization criterion is chosen as a minimum cluster size of 3. In other words, at least 3 of the original data records should be covered by the generalization. As the minimum cluster size of 3 data records has not been reached, the method is continued with another (second) generalization step 430.

In the further generalization step 430 the AOI-algorithm is applied on the set of data records of FIG. 7. The minimum value of $wN_{eqmax}$ is 4, it is the one for the redundant attribute T3. Thus, the redundant attribute T3 is generalized according to the $2^{nd}$ generalization step of the generalization rule of the third redundant attribute T3. The result is shown in FIG. 8.

In another grouping step 440 it is checked whether the former generalization step 430 has resulted in any identical generalized data records. In this example the generalized data record 804 and the generalized data record cluster 805 are identical and can hence be grouped in a cluster. This grouped second set of data records after the second generalization step is shown in FIG. 9. It comprises a data record cluster 902, which corresponds to the data record cluster 802 and is derived from the generalized data record cluster 702. Furthermore it comprises a data record cluster 904 covering the generalized data record 804 and the generalized data record cluster 805. As the data record cluster 805 covers already two data records, the data record cluster 904 covers in total 3 data records. Accordingly, it is recognized in step 450 that the predefined generalization criterion (minimum cluster size 3) is satisfied. Hence the AOI algorithm has delivered as a first result the data record cluster 904 that satisfies the required minimum data record cluster size of 3.

In a following merging step 460 the redundancy that was added in the expanding step 410 is removed from the found data record cluster 904. The data record cluster 904 is merged to a merged data record cluster 1001 as shown in FIG. 10. The merging step 460 is performed by means of merging the generalized intervals of the so far generalized data records by means of creating the intersection of the generalized intervals of the attributes T1, T2, T3 and T4.

Creating the intersection is the preferred operation here, since the original attribute values of attribute T in FIG. 3 will be contained in each of the generalized intervals of T1, T2, T3 and T4 in FIG. 10 and therefore will also be contained in the intersection of the generalized intervals of T1, T2, T3 and T4 in FIG. 10. In this example, the redundant attribute values of the redundant attributes T1, T2, T3 and T4 have been generalized to the generalized intervals 00:00-00:08, 00:02-00:10, 23:40-00:20 and 23:58-00:06. Then in the merging step, these generalized intervals of T1, T2, T3 and T4 are merged into a single interval and a single attribute T by means of an intersection. Hence the merged data record cluster comprises only one attribute T with the attribute value (attribute interval) 00:02-00:06. In other words, the highest value of the lower boundaries of the intervals and the lowest value of the upper boundaries of the intervals define the boundaries of the attribute T of the merged data record cluster 1001. Other presentations of intersections might be useful for other generalization hierarchies, especially if the generalized attribute value contains lots of intervals. According to another embodiment of the invention the cross product of the generalized attribute values, e.g., "May 16-30"ב"Weekend" as the cross product of T1 generalized to a 2-week interval and T2 generalized to the day(s) of the week, may be used.

According to an exemplary embodiment of the invention the loop of the steps 430-480 takes place after each single generalization of the redundant attributes T1, T2, T3, T4 to enable data record clusters being found with one or more attributes not being generalized. The summarization of the generalization of the redundant attributes T1-T4 as described with reference to FIG. 5 and FIG. 6 was chosen to simplify illustration. Generally, a data record cluster might be found before the first generalization step of any one of the redundant attributes T1, T2, T3 and T4 (which, e.g., might be the case if some different attribute U shows the same or smaller $wN_{eqmax}$ as T1, T2, T3 and T4 and if the minimum cluster size <=min ($N_{eqmax}$)). This would make the resulting data record cluster very expressive and valuable since it would show only one time point for T (while otherwise, an over-generalization might be caused showing an interval).

In a following step 470 it is checked whether there are sufficient remaining data records to continue clustering. Criteria might include, e.g., if a maximum desired number of data record clusters has been produced, and/or if some specified percentage of the second set of data has already been clustered, and/or if the number of data left would be sufficient to build a data record cluster of minimum size while the minimum size also might change (e.g. decrease) during clustering. In this example only the last criteria is taken. As there are three remaining data records, the method according to this embodiment of the invention is continued with a resolving step 480. In the resolving step 480 all the generalizations that have been performed so far are resolved for the remaining data records. In other words, the method is continued with the original second set of data records minus the data records of the original set of data records that belong to (i.e., are covered by) the found data record cluster 904 or 1001 respectively.

FIG. 11 shows as result of the resolving step 480 a table with the set of remaining data records 1100.

The set of remaining data records 1100 comprises three data records 1101, 1102 and 1103. The data records 1101, 1102 and 1103 are identical to the data records 501, 502 and 503 of FIG. 5.

The method is continued with another generalization step 430 for the set of remaining data records 1100. In other words, the AOI algorithm starts from scratch with the remaining set of data records 1100. Accordingly, for each attribute, i.e. for each column of the table of FIG. 11 the number $N_{eq}$ of attribute values that are identical is determined. Then the highest number of them is taken and called $N_{eqmax}$. In addition, $N_{eqmax}$ is weighed with the weighing factor. The weighed value of $N_{eqmax}$, also referred to as $w N_{eqmax}$, is shown in the lower row 11104.

Then the attribute value with the lowest $wN_{eqmax}$, also referred to as min ($wN_{eqmax}$), is chosen for generalization. In this example the attribute values of the attributes T1, T2, T3 and T4 comprises no identical attribute values. As the weight is 1, $wN_{eqmax}$ is 1 for the four redundant attribute values T1, T2, T3 and T4. The further attributes SIP, DIP and Signature comprises a maximum number of identical attribute values $N_{eqmax}$ of 3, namely S1 for SIP, DI for DIP and X for Signature. Hence $wN_{eqmax}$ is 12 for SIP, DIP and Signature.

According to the AOI algorithm of this exemplary embodiment of the invention, the attribute value with the lowest $wN_{eqmax}$, is chosen for generalization in the next generalization step. In this example, the lowest $wN_{eqmax}$, is 1 for T1, T2, T3 and T4. Accordingly, the attributes T1, T2, T3 and T4 are generalized in a generalization step 430 according to their corresponding generalization rules. For simplicity reasons, the single generalizations of each of T1, T2, T3 and T4 are shown together. However, the loop from steps 430 to step 480 might be performed after each single generalization to avoid over-generalized cluster results from the very beginning. The result of the four generalizations is shown in FIG. 12 with three generalized data records 1201, 1203 and 1203. The attribute values of the four redundant attribute values T1, T2, T3 and T4 have been generalized according to their corresponding generalization rules of the first generalization step. In other words, the points of times of the intrusion events have been replaced by the corresponding intervals defined by the first generalization step. As an example, the attribute value of T2 of the first data record (i.e. 1101) is 00:01:54. It falls within the interval 23:54-00:02 of the first generalization rule of the second attribute T2. Hence the point in time 00:01:54 is replaced by the time interval 23:54-00:02.

In a further grouping step 440, it is checked whether the generalization step 430 has resulted in any identical generalized data records. In this example, the generalized data records 1202 and 1203 are identical and can hence be grouped in a cluster. This is shown in FIG. 13. It comprises a data record cluster 1302, covering the generalized data records 1202 and 1203.

In step 450 it is checked whether the data record cluster 1302 satisfies the predefined generalization criterion which is in the example a minimum cluster size of 3. As the minimum cluster size of 3 data records has not been reached, the method is continued with a further generalization step 430.

In this further generalization step 430 the AOI-algorithm is applied on the set of data records of FIG. 13. The minimum value of $wN_{eqmax}$, shown in row 1303, is 2 for the attribute T2. Thus, the attribute T2 is generalized according to the $2^{nd}$ generalization step of the generalization rule of the second redundant attribute T2. The result is shown in FIG. 14.

In a further grouping step 440, it is checked whether the former generalization step 430 has resulted in any identical generalized data records. In this example, the generalized data records 1401 and 1402 are identical and can hence be grouped in a data record cluster. This grouped data record cluster is shown in FIG. 15. It comprises only one data record cluster 1501 covering the generalized data record 1401 and the generalized data record cluster 1402. As the data record cluster 1402 covers already two data records, the data record cluster 1501 covers in total 3 original data records. Accordingly, it is recognized in step 450 that the predefined generalization criterion (minimum cluster size 3) is satisfied. Hence the AOI algorithm has delivered as a second result the data record cluster 1501, that satisfies the required minimum data record cluster size of 3.

In a following merging step 460 the redundancy that was added in the expanding step 410 is removed from the found data record cluster 1501. The data record cluster 1501 is merged to a merged data record cluster 1601 as shown in FIG. 16. In this example, the redundant attribute values of the redundant attributes T1, T2, T3 and T4 have been generalized to the generalized intervals 00:00-00:08, 23:30-00:10, 23:56-00:04 and 23:58-00:06. Hence in the merging step these generalized intervals of T1, T2, T3 and T4 are merged into a single interval and a single attribute T by means of an intersection. The merged data record cluster 1601 comprises only one attribute T with the attribute value (attribute interval) 00:00-00:04. In other words, the highest value of the lower boundaries of the intervals and the lowest value of the upper boundaries of the intervals define the boundaries of the attribute T of the merged data record cluster 1601.

In a following step 470 it is checked whether there are sufficient data records that do not belong to the found data record clusters. This is not the case and the method is continued with a forwarding step 490. In this forwarding step 490 the found data record clusters may be sent e.g. from the computer analysis system 202 to the control unit 204 as shown in FIG. 2. There it can be used, maybe after some post-processing, for control or adaptation purposes of the computer network 201 or the intrusion detection system 200 and/or for other investigations or actions following an identified attack. According to other embodiments of the invention the forwarding step might be performed earlier, e.g. upon satisfaction of a predefined forwarding criteria. As an example, the forwarding step 490 might be performed after each finding of a data record cluster that satisfies the predefined generalization criteria, or after each finding of a data record cluster which fulfils certain criteria for a high state of alert.

By comparing the first merged data record cluster 1001 and the second merged data record cluster 1601 it can be seen that the attribute values of the time attribute T are overlapping with each other. Such results with overlapping data record clusters can be achieved due to the expanding step 410, in which the first set of data records 300 was expanded into a second set of data records 500 with four (or any other number>1 of) redundant attributes T1, T2, T3 and T4 for the time attribute T. This results in more natural data record clusters with more flexible borders. The higher the redundancy, the more flexible are the borders. In other words, the boundaries of the data record clusters correspond better to accumulations or anomalies and it is avoided that anomalies are cut into pieces due to a generalization hierarchy with fixed generalization borders. In this example, either the interval 00:02-00:06 or the interval 00:00-00:04 would not have been found with a redundancy=1 only, as there are 2 two values redundant to each other.

In addition, by comparing the first merged data record cluster 1001 and the second merged data record cluster 1601 it can be seen that these two attributes values of these two clusters are not in one line of any theoretically assumable generalization graph. This can be achieved as the chosen AOI-algorithm starts from scratch again when a data record cluster with the required size has been found.

It should be noted that any disclosed embodiment may be combined with one or several of the other embodiments shown and/or described. This is also possible for one or more features of the embodiments.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CDR/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments. Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

The invention claimed is:

1. A computer implemented method for analysing a first set of data records, wherein each data record comprises attribute values for one or more attributes, the method comprising the steps of:
a computer performing the steps of:
expanding the first set of data records into a second set of data records by creating for at least one of the attributes of the first set of data records at least two redundant attributes with corresponding redundant attribute values, wherein the redundant attribute values are identical to the attribute values of the first set of data records,
assigning different generalization rules to the at least two redundant attributes,
performing a generalization of the second set of data records by means of an attribute-oriented induction (AOI)-algorithm; and
grouping, by a computer, data records based on generalization of the second set of data records.

2. The computer implemented method of claim 1, wherein the generalization is performed by means of sequentially repeating the following steps in a loop until a predefined generalization criterion is satisfied:
selecting one or more of the attributes of the second set of data records for generalization according to a predefined selection strategy,
generalizing the attribute values of the selected attributes according to the corresponding generalization rule,
group data records that are covered by the generalization into a data record cluster.

3. The method according to claim 1, wherein the generalization rules for the redundant attributes define generalized attribute values for the corresponding redundant attribute values, wherein the generalized attribute values are value sets or value ranges.

4. The method according to claim 3, wherein at least two of the value sets or value ranges of different redundant attributes overlap with each other.

5. The method according to claim 3, wherein one or more generalized attribute values are generalized intervals.

6. The method according to claim 2, wherein the predefined selection strategy is a heuristic strategy.

7. The method according to claim 2, wherein the predefined selection strategy is defined by the steps of:
 determining the maximum number of identical attribute values for each of the attributes of the second set of data records; and
 selecting the attributes with the smallest maximum number of identical attribute values for the next generalization step.

8. The method according to claim 1, wherein the generalization rules of the attributes establish a generalization hierarchy.

9. The method according to claim 2, wherein the predefined generalisation criterion is a minimum cluster size of the data record clusters.

10. The method according to claim 2, wherein upon satisfaction of the predefined selection criterion, generalization is performed anew with the remaining data records.

11. The method according to claim 2, further comprising the step of
 merging the generalized attribute values of the redundant attributes of a data record cluster into a merged data record cluster by means of intersection.

12. The method according to claim 2, further comprising the step of
 forwarding the data record clusters for further processing if the number of data records covered satisfy a predefined forwarding criterion.

13. A non-transitory computer program product storing instructions for carrying out the steps of a method for analysing a first set of data records, wherein each data record comprises attribute values for one or more attributes, the method comprising the steps of:
 expanding the first set of data records into a second set of data records by creating for at least one of the attributes of the first set of data records at least two redundant attributes with corresponding redundant attribute values, wherein the redundant attribute values are identical to the attribute values of the first set of data records,
 assigning different generalization rules to the at least two redundant attributes,
 performing a generalization of the second set of data records by means of an attribute-oriented induction (AOI)-algorithm; and
 grouping data records based on generalization of the second set of data records.

14. A computer system for analysing a first set of data records, wherein each data record comprises attribute values for one or more attributes, comprising:
 a processor;
 attribute component for expanding the first set of data records into a second set of data records by creating for at least one of the attributes of the first set of data records at least two redundant attributes with corresponding redundant attribute values, wherein the redundant attribute values are identical to the attribute values of the first set of data records,
 rule component for assigning different generalization rules to the at least two redundant attributes, and
 processing component for performing a generalization of the second set of data records by means of an attribute-oriented induction (AOI)-algorithm; and for grouping data records based on generalization of the second set of data records.

* * * * *